US009202113B2

(12) United States Patent
Hoover et al.

(10) Patent No.: US 9,202,113 B2
(45) Date of Patent: *Dec. 1, 2015

(54) BALLOT ADJUDICATION IN VOTING SYSTEMS UTILIZING BALLOT IMAGES

(71) Applicant: Dominion Voting Systems, Inc., Denver, CO (US)

(72) Inventors: James Hoover, Outremont (CA); Justin Bales, Chula Vista, CA (US); Steven Bennett, Loma Linda, CA (US); Eric Coomer, Broomfield, CO (US); Sean Dean, Toronto (CA); Geneice Mathews, Golden, CO (US); Benjamin Rice, Brighton, CO (US)

(73) Assignee: Dominion Voting Systems, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,684

(22) Filed: Nov. 12, 2014

(65) Prior Publication Data
US 2015/0071501 A1    Mar. 12, 2015

Related U.S. Application Data

(63) Continuation of application No. 13/470,091, filed on May 11, 2012, now Pat. No. 8,913,787.

(51) Int. Cl.
*G06K 9/00* (2006.01)
*G07C 13/00* (2006.01)
*G06T 11/60* (2006.01)

(52) U.S. Cl.
CPC ............ *G06K 9/00442* (2013.01); *G06T 11/60* (2013.01); *G07C 13/00* (2013.01); *G06T 2207/10004* (2013.01)

(58) Field of Classification Search
None
See application file for complete search history.

(56) References Cited

U.S. PATENT DOCUMENTS

| 2005/0247783 | A1* | 11/2005 | Poulos et al. | 235/386 |
| 2006/0041516 | A1* | 2/2006 | Bogasky et al. | 705/76 |
| 2010/0252628 | A1* | 10/2010 | Chung | 235/386 |

OTHER PUBLICATIONS

Premier Election Solutions, Premier Central Scan User's Guide, Revision 4.0, Jul. 9, 2009.*

* cited by examiner

*Primary Examiner* — Nirav G Patel
(74) *Attorney, Agent, or Firm* — Holland & Hart LLP

(57) ABSTRACT

Methods, systems, and devices are described for adjudicating votes made on voter-marked paper ballots. Voter-marked paper ballots may be scanned to obtain optical image data of the voter-marked paper ballots. The optical image may be analyzed to determine the votes contained in the ballot for tabulation purposes. One or more votes on the ballot may be identified as requiring adjudication by an election official. Adjudication information, according to various embodiments, is appended to the optical images of the voter-marked paper ballots such that the image of the ballot and the image of the adjudication information may be viewed in an optical image. The optical image may be stored in a file format that allows the ballot image and the appended adjudication information to be viewed using readily available image viewers.

19 Claims, 16 Drawing Sheets

FIG. 2

City of Anywhere
General Municipal Election
January 1 1891

DRO: OLY

To vote, completely fill in the box(es) ☐ next to your choice(s), like this: ■

BALLOT FOR THE OFFICE OF MAYOR

Vote for only ONE (1) candidate

1) Robert L.     BORDON     ☐
2) Jean          CABOT      ☐
3) Jacques       CARTIER    ■
4) Samuel de     CHAMPLAIN  ☐
5) James         COOK       ☐
6) Leif          ERIKSSON   ☐
7) John          FRANKLIN   ☐
8) Henry         HUDSON     ☐
9) Jake          JOLIET     ☐
10) William L.M. KING       ☐
11) Wilfrid      LAURIER    ☐
12) John A.      MacDONALD  ☐
13) Lester B.    PEARSON    ☐
14) Louis S.     SAINT-LAURENT ☐
15) Pierre E.    TRUDEAU    ☐

BALLOT FOR THE OFFICE OF COUNCILLOR

Vote for ONE (1) 1st choice & ONE (1) 2nd choice, as shown at right

| | 1st | 2nd |
|---|---|---|
| Candidate 1 | ☐ | ☐ |
| Candidate 2 | ■ | ☐ |
| Candidate 3 | ☐ | ■ |

1) Miles J.    MASSEY    ■ ☐
2) Menelaus P. O'DANIEL  ☐ ■
3) Clause      VON ESPIE ☐ ☐

BALLOT FOR THE OFFICE OF ALDERMAN

Vote for up to THREE (3) candidates

1) Emily CARR ☐
2) Jeanne MANCE ■
3) Nellie McCLUNG ■
4) Lucy M. MONTGOMERY ☐
5) Mary PICKFORD ■
6) Fanny ROSENFELD ☐

— 505

DRO: 2109

Office Of Mayor: 0,0,1,0,0,0,0,0,0,0,0,0,0,0,0,78D
Vote for: Jacques CARTIER

Office of Councillor (800,0) (1,790), (0,0)
Vote for: Miles J. MASSEY (1st), Menelaus P. O'DANIEL (2nd)

Office of Alderman: 2,812,2,823,788,774
Vote for: Jeanne MANCE, Nellie McCLUNG, Mary PICKFORD

City of Anywhere
General Municipal Election
January 1 1891

DRO: OLY

To vote, completely fill in the box(es) ☐ next to your choice(s), like this: ■

| BALLOT FOR THE OFFICE OF MAYOR |
| --- |
| Vote for only ONE (1) candidate |

1) Robert L.       BORDON    ☐
2) Jean            CABOT     ☐
3) Jacques         CARTIER   ☒
4) Samuel de       CHAMPLAIN ☐
5) James           COOK      ☐
6) Leif            ERIKSSON  ☐
7) John            FRANKLIN  ☐
8) Henry           HUDSON    ☐
9) Jake            JOLIET    ☐
10) William L.M.   KING      ☐
11) Wilfrid        LAURIER   ☐
12) John A.        MacDONALD ☐
13) Lester B.      PEARSON   ☐
14) Louis S.       SAINT-LAURENT ☐
15) Pierre E.      TRUDEAU   ☐

— 615

BALLOT FOR THE OFFICE OF COUNCILLOR

Vote for ONE (1) 1st choice & ONE (1) 2nd choice, as shown at right

Candidate 1  ☐ ☐
Candidate 2  ■ ☐
Candidate 3  ☐ ■

1st  2nd
1) Miles J.      MASSEY   ■ ☐
2) Menelaus P.   O'DANIEL ☐ ■
3) Clause        VON ESPIE ☐ ☐

BALLOT FOR THE OFFICE OF ALDERMAN
Vote for up to THREE (3) candidates

1) Emily CARR ☐
2) Jeanne MANCE ■
3) Nellie McCLUNG ■
4) Lucy M. MONTGOMERY ☐
5) Mary PICKFORD ■
6) Fanny ROSENFELD ■

— 605

— 620

DRO: 2109

Office Of Mayor: 0,0,1,0,0,0,0,0,0,0,0,0,0,0,0,78D
Vote for: AMBIGUOUS

Office of Councillor (800,0) (1,790), (0,0)
Vote for: Miles J. MASSEY (1st), Menelaus P. O'DANIEL (2nd)

Office of Alderman: 2,812,2,823,788,774
Vote for: OVER-VOTE

City of Anywhere
General Municipal Election
January 1 1891

DRO: OLY

To vote, completely fill in the box(es) ☐ next to your choice(s), like this: ■

| BALLOT FOR THE OFFICE OF | MAYOR |
|---|---|
| Vote for only ONE (1) candidate | |

1) Robert L. BORDON ☐
2) Jean CABOT ☐
3) Jacques CARTIER ☒
4) Samuel de CHAMPLAIN ☐
5) James COOK ☐
6) Leif ERIKSSON ☐
7) John FRANKLIN ☐
8) Henry HUDSON ☐
9) Jake JOLIET ☐
10) William L.M. KING ☐
11) Wilfrid LAURIER ☐
12) John A. MacDONALD ☐
13) Lester B. PEARSON ☐
14) Louis S. SAINT-LAURENT ☐
15) Pierre E. TRUDEAU ☐

615-a

BALLOT FOR THE OFFICE OF COUNCILLOR
Vote for ONE (1) 1st choice & ONE (1) 2nd choice, as shown at right
Candidate 1 ☐ ☐
Candidate 2 ■ ☐
Candidate 3 ☐ ■

1st  2nd
1) Miles J. MASSEY ■ ☐
2) Menelaus P. O'DANIEL ☐ ■
3) Clause VON ESPIE ☐ ☐

BALLOT FOR THE OFFICE OF ALDERMAN
Vote for up to THREE (3) candidates

1) Emily JEANNE
2) Jeanne NELLIE
3) Nellie LUCY M.
4) Lucy M. MARY
5) Mary FANNY
6) Fanny ROSENFELD PICKFORD MONTGOMERY McCLUNG MANCE CARR 620-a 605-a

---

DRO: 2109

Office Of Mayor: 0,0,1,0,0,0,0,0,0,0,0,0,0,0,0,78D
Vote for: AMBIGUOUS

Office of Councillor (800,0) (1,790), (0,0)
Vote for: Miles J. MASSEY (1st), Menelaus P. O'DANIEL (2nd)

Office of Alderman: 2,812,2,823,788,774
Vote for: OVER-VOTE 610-a

Adjudication Session on Batch – 1, Ballot – 1, by
User – Admin from Machine ADJUDICATION1
    Office of Mayor
        01/02/1891 12:59:31 PM Office of Mayor
Choice 3 > Marginal Mark: Mark ADDED
        01/02/1891 12:59:36 PM Contest
ADJUDICATED

DRO: 2109

Office Of Mayor: 0,0,1,0,0,0,0,0,0,0,0,0,0,0,0,78D
Vote for: OVER-VOTE

Office of Councillor (800,0) (1,790), (0,0)
Vote for: Miles J. MASSEY (1st), Menelaus P. O'DANIEL (2nd)

Office of Alderman: 2,812,2,823,788,774
Vote for: OVER-VOTE

Adjudication Session on Batch – 1, Ballot – 1, by
User – Admin from Machine ADJUDICATION1
    Office of Mayor
        01/02/1891 12:59:31 PM Office of Mayor
Choice 3 > Stray Mark: Mark removed
        01/02/1891 12:59:36 PM Contest
ADJUDICATED

BALLOT ADJUDICATION IN VOTING SYSTEMS UTILIZING BALLOT IMAGES

CROSS REFERENCES

This application is a continuation of U.S. patent application Ser. No. 13/470,091, filed May 11, 2012, entitled, "BALLOT ADJUDICATION IN VOTING SYSTEMS UTILIZING BALLOT IMAGES," which is incorporated by reference in its entirety for all purposes.

BACKGROUND

The present invention relates to voting systems in general and, in particular, to methods and systems for adjudicating ballots utilizing ballot images.

Electronic tabulation of voter-marked paper ballots has been used in elections for some time. Such systems may provide efficient vote tabulation if ballots are received without any errors, modifications, or write-in candidates included on the ballot. Electronic tabulation systems for voter-marked ballots may include optical scanners that scan the voter-marked ballots. Such ballots may have a target area that is evaluated by a computer that receives an image of the scanned ballot to determine if a vote is cast for a particular election, such as a bubble or square next to a candidate's name on a ballot. Electronic tabulation systems may also receive ballots generated from direct-recording electronic (DRE) voting machines, in which a voter may electronically enter votes without a voter-marked paper ballot.

In some instances optical scan systems may not be able to determine with high confidence that a particular vote has been cast. For example, a voter may partially fill in a target area next to a candidate name, may place a mark next to the target area rather than filling in the target area, and/or soil the ballot in some fashion (e.g., coffee stain).

Furthermore, in many jurisdictions voter intent is used as a basis for evaluating and adjudicating ballots for purposes of tabulating votes. Thus, if a voter improperly completed a ballot with a mark outside of a target area, a review of the ballot may indicate that the voter intended to cast a certain vote, and thus the ballot should be properly tabulated to include the intended vote. Similarly, a voter may mark an area for a particular candidate, and afterward realize that they made an error or change their mind. The voter may cross out the vote and mark a different area for a different candidate, and make a note such as, for example, writing "not this one" next to the crossed-out mark. An electronic scanning and tabulation system may not tabulate such a vote properly, while a human review of the ballot may readily reveal that the voter did intend to vote for the different candidate. Such instances may consume a significant amount of resources at the polling place or later, when the votes recorded on the ballots are being tabulated.

Furthermore, many jurisdictions have a number of voters that vote through a mail-in ballot, and in some elections the voting may be done exclusively through mail-in ballots. Such mail-in ballots may have an increased likelihood of votes requiring adjudication, as the voter is not able to simply ask for a new ballot if they improperly mark or otherwise soil their original ballot. Furthermore, voters may complete mail-in ballots at their home, which may increase the likelihood that a ballot will be soiled with food or drink stains, which may lead to incorrect vote tabulation by an optical scan tabulation system.

SUMMARY

Methods, systems, and devices are described for adjudicating votes made on voter-marked paper ballots. Voter-marked paper ballots may be optically scanned to obtain optical image data of the voter-marked paper ballots. The optical image data may be analyzed to determine the votes contained in the ballot for tabulation purposes. One or more votes on the ballot, or the ballot as a whole, may be identified as requiring adjudication by an election official. Adjudication information, according to various embodiments, is appended to the optical images of the voter-marked paper ballots such that the image of the ballot and the image of the adjudication information may be viewed in an optical image. The optical image may be stored in a file format that allows the ballot image and the appended adjudication information to be viewed using readily available image viewers.

In one set of embodiments, methods for ballot adjudication of a voter-marked paper ballot are provided that include receiving optical image data comprising an optical image of a voter-marked paper ballot, identifying one or more votes recorded on the voter-marked paper ballot to be adjudicated, receiving adjudication information for the ballot, generating image data comprising the received adjudication information for the ballot, and appending the image data comprising the received adjudication information for the ballot to the optical image data.

In other embodiments, a system for adjudication of voter-marked paper ballots is provided. The systems, according to various embodiments, may comprise a receiver module configured to receive ballot optical image data comprising an optical image of a voter-marked paper ballot, and an adjudication module configured to receive adjudication information for the ballot, generate image data comprising the received adjudication information for the ballot and append the image data for the ballot to the optical image data. The adjudication module may be configured to receive an indication that the ballot requires adjudication when a mark within a target area of the ballot is determined to be ambiguous. In some embodiments, the adjudication module is further configured to provide an image of the ballot for review by an election official and receive the adjudication information from the election official. In some embodiments, multiple election officials may adjudicate a ballot, with each adjudication having corresponding image data comprising the received adjudication information for the ballot that is appended to the image data for the ballot.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 is an image of a paper ballot according to various embodiments.

FIG. 5 is an image of a voter-marked paper ballot with an audit mark according to various embodiments.

FIG. 6 is an image of a voter-marked paper ballot containing an ambiguous mark according to various embodiments.

FIG. 9 is an image of a voter-marked paper ballot containing an ambiguous mark, an audit mark, and an adjudication mark, according to various embodiments.

DETAILED DESCRIPTION

Figure 1:
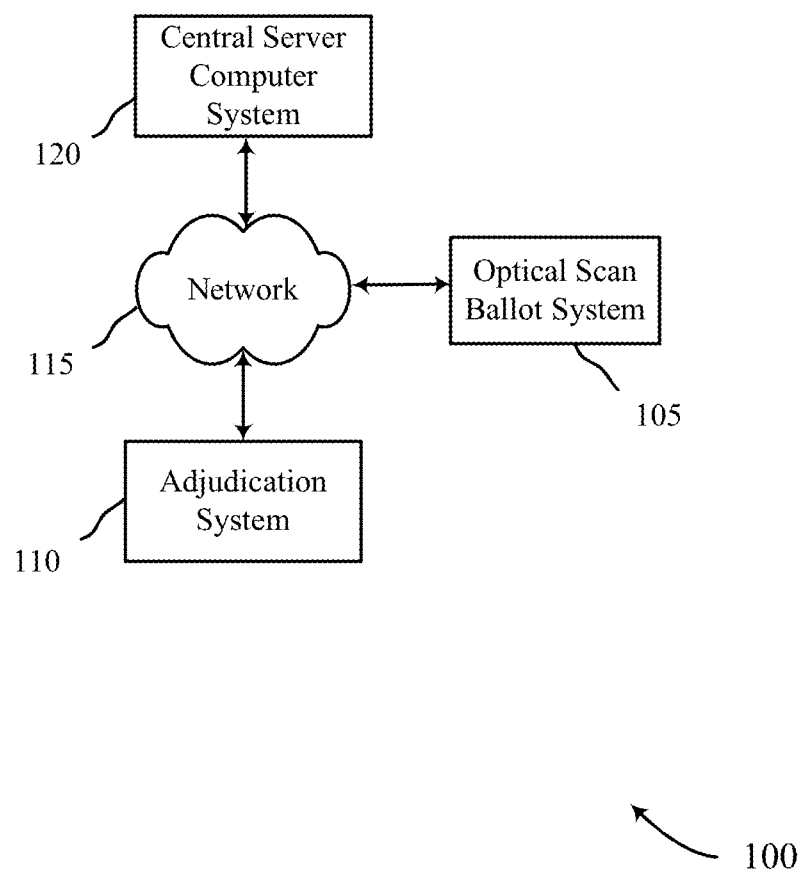
FIG. 1 is a block diagram of a ballot scanning, tabulation, and adjudication system including components configured according to various embodiments.

Methods, systems, and devices are described for adjudicating votes made on voter-marked paper ballots. Voter-marked paper ballots may be scanned to obtain optical image data of the voter-marked paper ballots. The optical image may be analyzed to determine the votes contained in the ballot for tabulation purposes. One or more votes on the ballot, or the ballot as a whole, may be identified as requiring adjudication by an election official. Adjudication information, according to various embodiments, is appended to the optical images of the voter-marked paper ballots such that the image of the ballot and the image of the adjudication information may be viewed in an optical image. The optical image may be stored in a file format that allows the ballot image and the appended adjudication information to be viewed using readily available image viewers.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

It may be beneficial to provide the ability to audit the election results. In some instances, one or more votes on a voter-marked paper ballot may need to be adjudicated by an election official. Such adjudication may be used in order to establish the intent of the voter that marked the paper ballot. For example, an optical scan tabulation system may not record a vote for a particular candidate because a box or bubble next to the candidate's name was not completely filled in. An election official reviewing such a ballot may readily conclude that the voter intended to cast a vote for the particular candidate, and that the optical scan tabulation system simply did not tabulate the vote because the mark for the candidate did not register as a vote for the candidate.

When auditing election results, officials may desire to view the original ballot, along with any adjudications of votes on the ballot. In many instances, the assessment of what constitutes a vote in favor of a particular candidate or a particular answer to a question is determined by subjective assessment. Thus, in order to maintain integrity of the election process, a record of ballot adjudications may be desired, such that a record of the originally tabulated vote and any adjudicated votes are clear.

With reference now to FIG. 1, a block diagram of a ballot scanning, tabulation, and adjudication system 100 according to some embodiments is described. In the system 100 of FIG. 1, an optical scan ballot system 105 is configured to receive voter-marked paper ballots, scan the ballots, and provide an optical image of the voter marked paper ballots. The optical scan ballot system 105 may include any of several types of scanning equipment, and in an embodiment includes a feeding mechanism that receives ballots and feeds the ballots through a scanner and then into a ballot box. In some embodiments, the optical scan ballot system marks each scanned ballot with one or more marks that may be used to identify the paper ballot. In other embodiments, the optical scan ballot system 105 evaluates marks on the ballots and determines votes made by the voter. These determined votes may be stored for tabulation to determine election outcome. In some embodiments, determined votes may be printed on the ballots by the optical scan ballot system 105 using an internal printer. According to a set of embodiments, an optical image of the ballot is obtained by the optical scan ballot system 105, and in some embodiments the vote outcomes determined by the optical scan ballot system 105 are included as an audit mark in the optical image. Such an optical image may then be viewed by other systems to display the optical image of the voter-marked paper ballot along with the audit mark provided by the optical scan ballot system 105. Examples of optical scan ballot systems 105 will be described in more detail below.

The ballot scanning, tabulation, and adjudication system 100 of FIG. 1 may also include adjudication system 110. The adjudication system 110 is connected through a network 115 to the optical scan ballot system 105 and to a central server computer system 120. Adjudication system 110 may receive data containing the optical images of paper ballots and audit marks and the votes recognized by the optical scan ballot system, if provided, from the optical scan ballot system 105. In some cases, the adjudication system 110 may receive data containing the optical images of paper ballots and audit marks from an election tabulation manager located at the central server computer system 120. An election official using the adjudication system 110 may review optical images of the paper ballots, and, based on the review, make a determination as to whether the marks were properly counted as votes or whether changes should be made to properly record the votes on the paper ballot. In some embodiments, an audit mark is viewable along with the image of the paper ballot allowing the election official to review the votes recognized by the optical scan ballot system and compare the votes to the marks on the paper ballot. The election official may make any necessary changes and enter the changes through the adjudication system 110, which then may append an image to the optical image of the ballot that includes the adjudication information. Such an appended image may be referred to as an adjudication mark. Adjudication system 110 and central server computer system 120 will be described in additional detail below.

Figure 2:
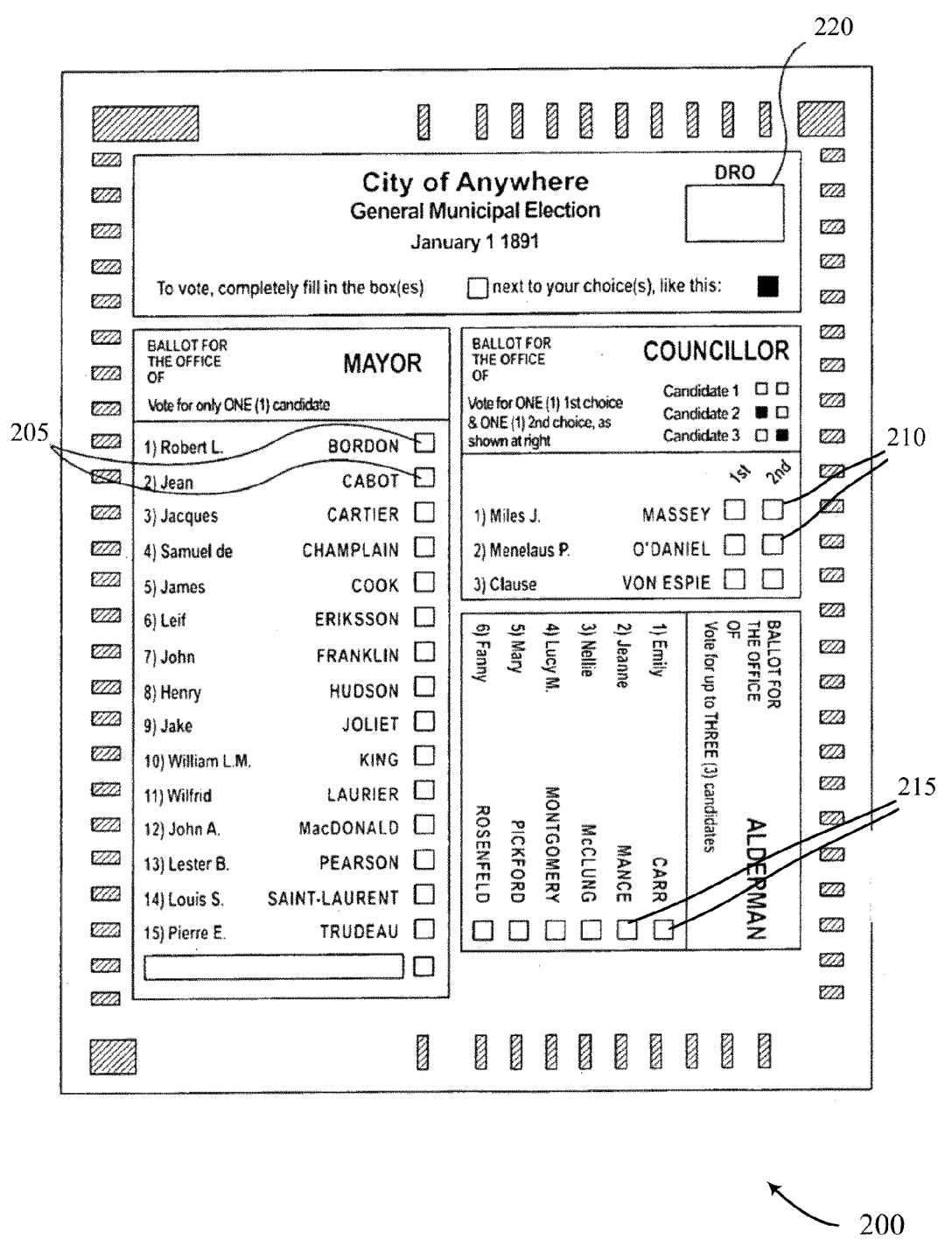

With reference now to FIG. 2, an example of a paper ballot 200 is described. The ballot 200 includes a number of voter selection areas 205, 210, 215 that represent voter selections for different offices or ballot questions. In the example ballot 200, there is also an election official area 220, which may be used by an election official to validate the particular ballot. Such validation may take the form of a signature or initials in the election official area 220 by an election official, however, other types of authentication may also be used. The election official area 220, according to a set of embodiments, serves to mark the paper ballot 200 as having been officially issued. It will be readily understood that paper ballots such as ballot 200 may include pre-printed ballots and/or ballots printed locally on-demand by a local printer. The voter will generally take the validated blank paper ballot 200 to a private area (such as a desk with privacy barriers), and make a mark or marks (this can be done in numerous ways such as filling in a box or oval, etc) beside the chosen candidate(s) with a marking instrument. While this disclosure may generally refer to selection of a candidate or candidates, it will be readily understood that some votes relate to other questions such as referendum questions, ballot initiatives, and the like. The concepts described herein extend to votes obtained all matters whether candidates, weighted candidate votes, referendum questions and the like.

Figure 3:
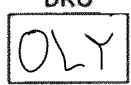
FIG. 3 is an image of a voter-marked paper ballot according to various embodiments.

FIG. 3 illustrates an example of a ballot 300 that has been properly completed by a voter. After the voter has marked the ballot 300, the voter may provide the ballot to be tabulated. In some situations, the voter may drop the completed ballot (e.g., ballot 300) into a ballot box that election officials then take for processing and tabulation. In some embodiments, the election officials may direct the voter to place the ballot into an optical scan ballot system, such as optical scan ballot system 105 illustrated of FIG. 1, that scans the ballot and performs processing to determine the votes on the ballot.

Figure 4:
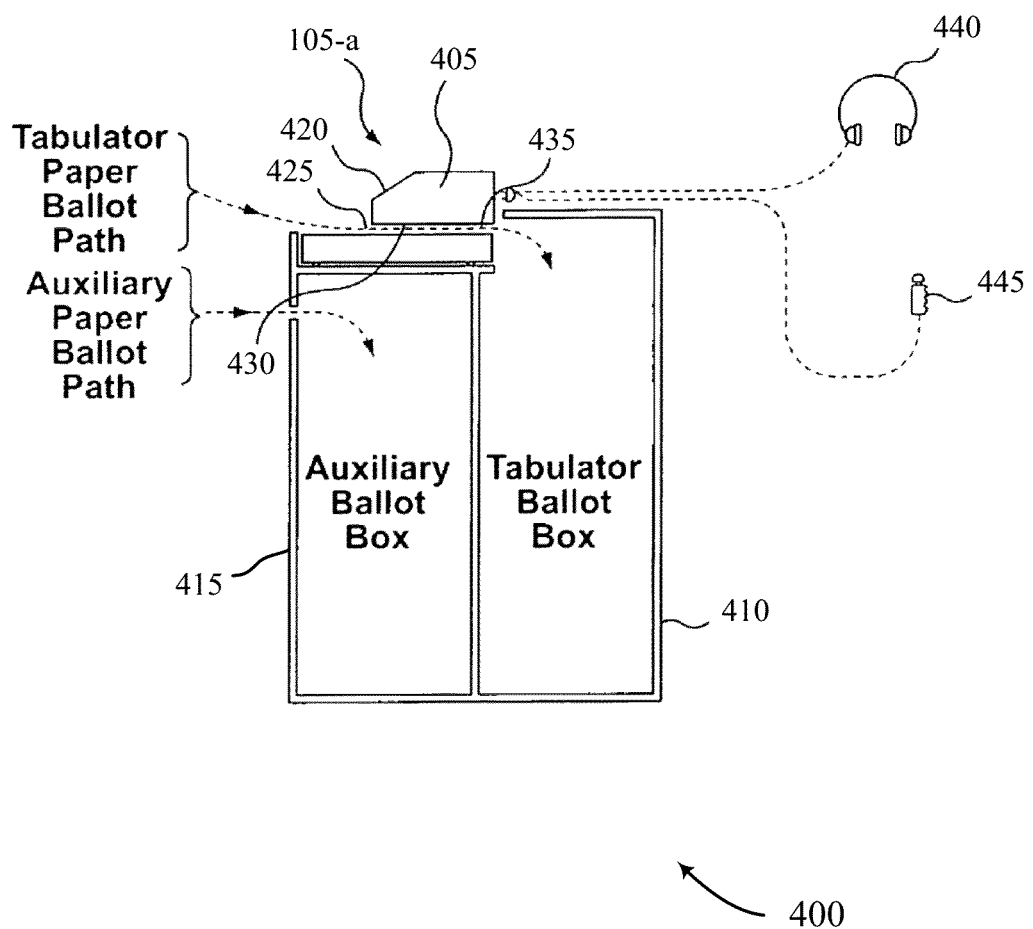
FIG. 4 is an illustration of an optical scan ballot system according to various embodiments.

FIG. 4 is an illustration of a ballot receiving system 400 according to some embodiments. In one set of embodiments, the ballot receiving system 400 includes an optical scan ballot system 105-a that includes a hybrid paper/electronic vote tabulator 405. The hybrid paper/electronic vote tabulator 405, also referred to as a tabulation unit, is coupled with tabulator ballot box 410. An optional auxiliary ballot box 415 is also illustrated in FIG. 4, and may receive ballots that are not provided to the optical scan ballot system 105. As voters come into the polling location, they may be processed by an election official who determines voter eligibility (based on local election rules), and also determines the proper ballot for the voter. The voter may then mark the ballot and take the marked paper ballot to the tabulation unit 405. In some embodiments, the tabulation unit 405 includes a display 420 that instructs the voter to feed the ballot into the tabulation unit 405 through path 425. The ballot may then be fed through the tabulator unit 405 and an image of the ballot created using a digital scanning device 430. According to various embodiments, the scanning device 430 takes a high resolution optical scan of the ballot and moves the ballot into the tabulator ballot box 410 through opening 435. In one particular aspect of the invention, the tabulation unit 405 takes the resulting high resolution scanned image of the entire ballot, and saves a copy of this image to a non-volatile memory linked to the optical scan ballot system 105-a. System 400 may also include, as illustrated in FIG. 4, earphones 440, and a pendant manual trigger 445, for use by voters that require such devices.

The tabulation unit 405 of a set of embodiments includes a processing module that executes software code to analyze the optical image of the ballot to determine the votes recorded on the ballot. The tabulation unit 405, in some embodiments, also randomly assigns a filename to each scanned image to ensure that the order in which the ballots were scanned remains private. The tabulation unit 405 may also send a copy of the images to the central server computer system 120 and/or the adjudication system 110 of FIG. 1 for image recognition. In embodiments where tabulation unit 405 performs image processing, a ballot processing application runs an image recognition routine that is applied to the digital image and enables the tabulation unit 405 to selectively recognize specific areas of each image and may analyze such specific areas as described in more detail below to define a series of processing results associated with the particular ballot.

For example, the tabulation unit 405 may analyze the various security markings on the ballot to ensure it is a valid ballot, perform a pixel count check to verify that the election official area 20 was initialed by the election official, and perform a pixel count of each voter selection area on the ballot. In addition, as further examples of such processing results, depending on the pixel count of each marking box, the mark may be classified as a 'vote', a 'non-vote.' or an 'ambiguous mark.' These classifications may be based, for example, on the total pixel counts of the marking areas (e.g., areas 205, 210, and 215 in the example of FIG. 2) of the ballot, and/or a pattern of pixels in the marking areas. The determination of a vote, non-vote, or ambiguous mark is made according to pixel levels defined by election officials at a given time prior to the election. According to some embodiments, election officials may define, in pixels, the minimum pixel count that is to be classified as a 'vote,' the maximum pixel count (if any) that is to be defined as a definite 'non-vote,' and a range of pixels in between those values that will constitute an 'ambiguous mark.' These pixel values are loaded on each tabulation unit 405. After calculating these pixel values for each marking area, the tabulation unit 405 may return the ballot to the voter with an appropriate error message if any errors are detected in the ballot, or feed the ballot to the tabulator ballot box, An error may be detected, for example, if one or more voting areas contain an ambiguous mark, if too many marking areas in one category were classified as votes resulting in an "over-vote," if no marking areas in one or more category were classified as votes (resulting in a blank ballot for one or more elections) and/or no pixel count was recorded in the election official area. In some embodiments, the tabulation unit 405 may be programmed to allow a voter to verify the ballot in the case of over-voted or blank ballots, thus preserving the voter's right to cast an over-voted or blank ballot. In other embodiments, the optical scan ballot system 105-a may return a ballot to the voter when an ambiguous mark or over-vote is detected, allowing the voter to correct the ballot or obtain a replacement ballot.

In some embodiments, once the determination of the total votes for a ballot has been made, the tabulation unit 405 appends a footer to the saved ballot image that contains processing results for that specific ballot. FIG. 5 illustrates an image 500 that includes an optical image of a voter-marked paper ballot 505 as shown in FIG. 3, along with an audit mark 510 that is appended to the ballot optical image. The audit mark 510, according to some embodiments, is included as an image in the same file that contains the optical image of the voter-marked paper ballot. In such a manner, if a user displays the optical image of the voter-marked paper ballot, the audit mark will also be displayed allowing the user to view the ballot and voter markings as well as information on how the tabulation unit registered the votes for the ballot. Such a system allows for auditing of election results in an efficient manner. It will be understood that appending an optical audit mark image to the ballot optical image is just one manner in which the votes recorded for a ballot may be associated with the ballot. In other embodiments, the information from the tabulation unit may be stored in a separate database and associated with a particular ballot, or may be stored in the ballot optical image file as extra data or metadata that may or may not be displayed along with an image of the ballot. The embodiment of FIG. 5 illustrates the audit mark 510 at a footer of the optical ballot image 505, although it will be readily understood that an audit mark image 510 may be located at different locations relative to the ballot image 505. The audit mark 510 may also be referred to as a "fingerprint" or a "vote stamp" that is attached or otherwise associated with each image.

In embodiments where the audit mark 510 is appended as an image to the voter-marked paper ballot optical image 505, the image may be saved in a format that is widely viewable by a variety of different image viewers. For example, the optical image may be stores as a .jpg file, a .tiff file, or a .pdf file, to name just a few examples. Various different types of viewers may be used to display such files, allowing the review of election results that does not require specialized software. Furthermore, the inclusion of an audit mark with the ballot optical image allows for review of how an optical scanning system read the particular ballot through simply viewing the optical image file.

With reference again to FIG. 4, the ballot receiving system 400 may also include components to enable voting by an individual with a challenge such as visual impairment, illiteracy, inability to read the language in which the ballot is written, physical impairment with only limited motor abilities, etc. In such cases, an election official may initialize, for example, an "audio ballot" which may be administered directly by the tabulation unit 405. When the election official initializes, or activates, the audio ballot the voter may put on earphones 440 and take hold of the handheld pendant that includes the manual trigger selector 445. According to various embodiments, an audio ballot may simply be an audio version of the ballot, which may be stored to a local memory of the tabulation unit 405. The voter negotiates through the ballot through the audio interface and makes candidate selections via the manual trigger 440. In one embodiment, each time the voter makes a selection, and upon completion of voting for each individual race, the tabulation unit 405 asks the voter to confirm the choices after it is audibly reviewed. Upon completion of the audio ballot, a final review may be read back to the voter, and the voter is asked one more time to confirm the selected choices. In one embodiment, the tabulation unit 405 includes a printer that allows printing of the voter's selections on the ballot, and an optical image thereof may also be generated. In other embodiments, an audio clip of the final voter review, along with a subsequent audible voter confirmation of the review, may be recorded and stored in the tabulation unit 405. In other embodiments, this set of voter selections stored electronically that do not have a paper record can be used to create an optical image file that presents the vote selections in the same or similar format as a marked ballot, which can be printed and scanned in a similar fashion as other scanned paper ballots. In addition, once the voter is finished with this final review, the election official may provide the voter one last chance to cancel the ballot and start over. Once the final review is completed, the tabulation unit 405 may be used to cast the audio ballot. By doing so, the votes from that audio ballot are appended to the ongoing tally of the tabulation unit 405, an audio recording to the process may be saved to the memory, and optionally a printer associated with the tabulation unit may prints the vote on a paper ballot or print a summary of the audio vote onto a paper chit. The ballot or chit then falls into the tabulator ballot box 410 in order to maintain secrecy, or may be printed in encrypted form for audio playback on either the tabulation unit 405 or external device.

At the end of voting, in real time, or periodically throughout the voting process, the tabulation unit 405, according to various embodiments, maintains an ongoing tally for all the ballots that passed through that particular machine, and those results may be transmitted by various known methods and technologies to a central location such as central server computer system 120 of FIG. 1. The central server computer system 120 may include, for example, a central election database that stores results from a number of optical scan ballot systems 105-a located throughout the election jurisdiction. The various election results from the various optical scan ballot systems 105-a may be summed together, provided to election officials, and stored to a memory, according to various embodiments.

As described above, while voting occurs or once the vote has been completed, the optical image data for each of the scanned ballots along with the appended audit mark if present, may be transferred to the central server computer system 120. Election officials may perform various management, auditing, and adjudication tasks. In some embodiments, to ensure that the tabulation units 405 have functioned correctly, and also to verify the integrity of the vote overall, auditing of the optical image data may be performed. This may be in the form of a random spot check, a structured check to gain a certain confidence rate in the tabulator integrity, or a complete check of every ballot cast. Additionally, adjudication may be needed to determine proper votes cast on particular ballots. In some embodiments, an election information collection and management module located at the central server computer system, as will be described in additional detail below, identifies ballots that require adjudication. Such ballots may be ballots that were identified by the optical scan ballot system 105 as having errors, provisional or challenge ballots, and/or ballots that are damaged and unable to be read, for example.

Ballots identified as requiring adjudication may be provided to an election official who may confirm, correct, or appropriately change one or more votes recorded for the particular ballot based on their review of the ballot optical image. For example, FIG. 6 illustrates a ballot optical image 600 including an image of the voter-marked paper ballot 605 and an appended audit mark 605. In this particular example, the ballot includes two errors. The first error is an improperly filled in selection 615, where the voter simply marked a box with an X rather than filling in the box. The optical analysis of this ballot by the optical scan ballot system 105 (or other system that performs optical analysis of ballots to determine votes), as indicated in the audit mark 610, identified mark 615 as AMBIGUOUS. This may result from the number of pixels for the particular ballot area being below the defined threshold for counting the mark as a vote and above the defined threshold for identifying the mark as ambiguous, as described above. The second error on the ballot 605 is an overvote 620 for the office of Alderman. An election official may review this optical image and readily discern that mark 615 indicates that the voter intended to vote for Jacques Cartier for the office of Mayor, and that mark 620 is, in fact, an overvote. The election official may update the vote recorded for the ballot 605 to include a vote for Jacques Cartier and include no vote for the office of Alderman because the intention of the voter is not able to be discerned.

Figure 7:
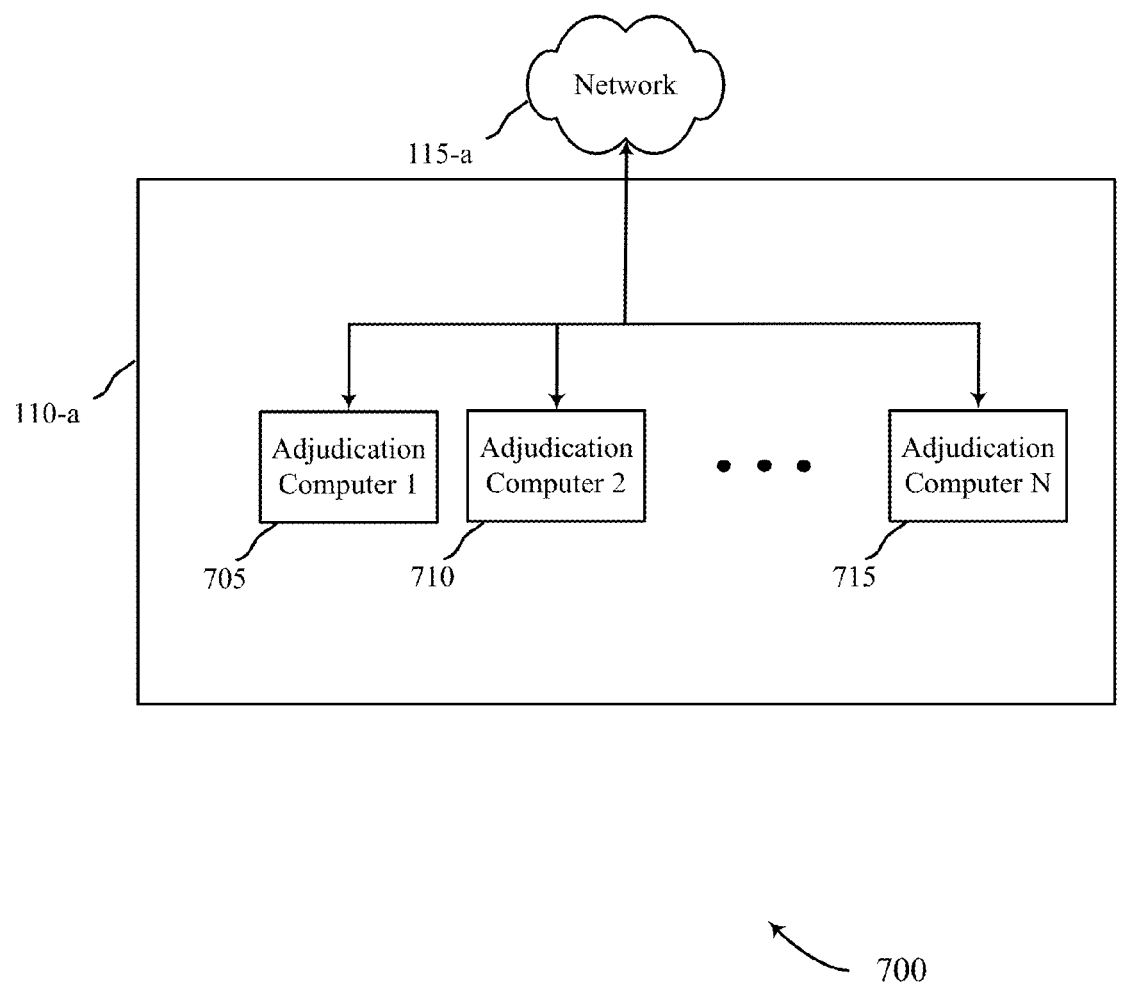
FIG. 7 is a block diagram of an adjudication system according to various embodiments.

Depending on the adjudication strategy used, an adjudication committee, for example, may have any number of terminals accessing the ballot optical images. With reference now to FIG. 7, an adjudication architecture 700 is described for a set of embodiments. An adjudication system 110-*a* may be coupled with network 115-*a*, and may receive optical image data for ballots identified as requiring adjudication. The optical image data may be provided by a central system, such as central server computer system 120 of FIG. 1, or may be provided directly from a ballot scanner such as optical scan ballot system 105 of FIG. 1 or 4. The adjudication system 110-*a* in this example includes a number of adjudication computers 705 through 715, that may be used to review ballot optical images, review audit marks associated with the ballots, and make determinations on whether particular marks on ballots should be recorded as votes.

Figure 8:
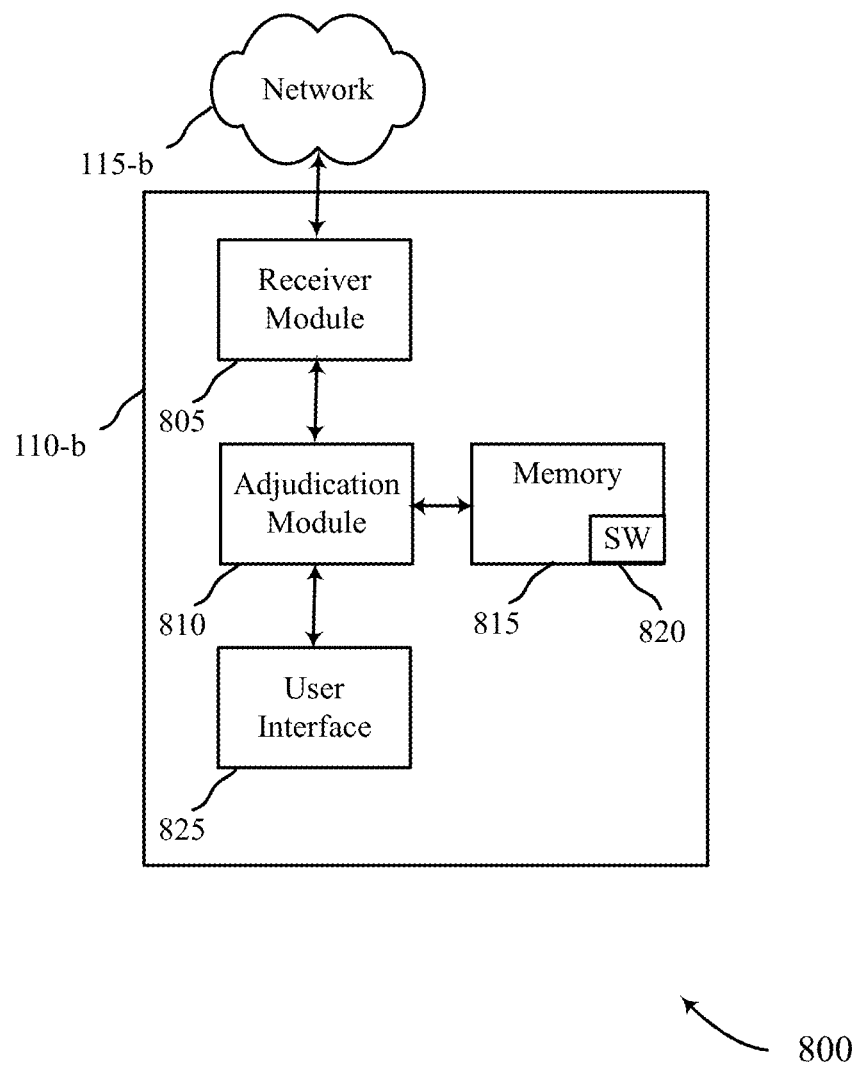
FIG. 8 is a block diagram of an adjudication computer according to various embodiments.

With reference now to FIG. 8, an adjudication architecture 800 according to another set of embodiments is described. In FIG. 8, an adjudication system 110-*b* is coupled with network 115-*b*, and may receive optical image data for ballots identified as requiring adjudication. The optical image data may be provided by a central system, such as central server computer system 120 of FIG. 1, or may be provided directly from a ballot scanner such as optical scan ballot system 105 of FIG. 1 or 4. The adjudication system 110-*b* in this example may be an example of one of the adjudication computers 705 through 715 of FIG. 7, may be a stand alone computer, or may be a computer that is connected directly to an optical scan ballot system. Adjudication system 110-*b* may be used to review ballot optical images, review audit marks associated with the ballots, and make determinations on whether particular marks on ballots should be recorded as votes. In some embodiments, adjudication system 110-*b* includes a receiver module 805, an adjudication module 810, a memory 815 that includes software 820, and a user interface 825. The receiver module 805 may include, for example, network interface hardware to allow connection with and communication over network 115-*b*. Such network interface hardware may include wired or wireless network interface cards and components, as are well understood in the art.

The adjudication module 810 may receive ballots to be adjudicated through the receiver module and may provide optical images of the ballots, and any included audit mark or other audit information, to the user interface 825. The user interface may include a monitor to display images to the election official, as well as a keyboard, mouse, or other data input device, as are well known. An election official accessing the user interface 825 may review the provided optical image and make a determination on votes for the ballot. The election official may provide input to the user interface 825, that the adjudication module 810 receives and uses to generate an adjudication mark. The adjudication module 810 may generate an optical image of the adjudication mark and append the adjudication mark to the ballot optical image, along with other relevant adjudication information. The optical image data including the adjudication mark may then be provided to the receiver module 805 and transmitted, for example, back to the central server computer system. Adjudication information may include adjudication of votes for a ballot, as well as information related to the date and time of adjudication, and identification of the election official that performed adjudication, for example.

Memory 815 may include random access memory (RAM) and read-only memory (ROM), and store computer-readable, computer-executable software code 820 containing instructions that are configured to, when executed (or when compiled and executed), cause the adjudication module 810 to perform various functions described herein (e.g., provide ballot optical images for review, receive adjudication information, append an optical image of the adjudication information to the ballot optical image, etc.). The components of the adjudication system 110-*b* may, individually or collectively, be implemented with one or more Application Specific Integrated Circuits (ASICs) adapted to perform some or all of the applicable functions in hardware. Each of the noted modules may be a means for performing one or more functions related to operation of the adjudication system 110-*b*.

With reference now to FIG. 9, an example of a ballot optical image 900 following adjudication is described. In this example, the ballot optical image 900 includes an image of voter marked paper ballot 605-*a* and audit mark 610-*a* as illustrated in FIG. 6. As described above, the voter marked paper ballot 605-*a* includes two errors related to marks 615-*a* and 620-*a*. An election official may review the marks, and make an adjudication that mark 615-*a* is, in fact, a vote for Jacques Cartier, which is choice 3 on the ballot. The election official inputs this adjudication into the user interface of the adjudication system 110, and the adjudication system 110 generates image data 905 that includes the adjudication information. In the example of FIG. 9, the image data 905 of the adjudication information is appended to the ballot optical image data below the audit mark 610-*a*. In embodiments that do not include an audit mark image 610-*a*, image data 905 for the adjudication information may simply be appended to the ballot optical image data below the ballot optical image 605-*a*, or at another suitable location adjacent the optical image of the ballot 605-*a* and/or audit mark 610-*a*. The adjudication information in image data 905, in this example, includes an identification of the user, namely the election official that performed the adjudication, an identification of the particular ballot question or office that was adjudicated, the change in the vote that was adjudicated, and a reason. In the example image data 905, it is noted that choice 3 was adjudicated (corresponding to Jacques Cartier) and that a marginal mark, corresponding to the ambiguous mark for that candidate, was added as a vote for the candidate. In such a manner, another user, election official, candidate representative, or observer may view the optical image and readily discern the image of the ballot as it was cast by the voter, the result of the initial optical scan of the ballot, and how the ballot was adjudicated. This can provide enhanced transparency and confidence in election results.

Figure 10:
FIG. 10 is an image of a soiled voter-marked paper ballot containing an audit mark and an adjudication mark according to various embodiments.

With reference now to FIG. 10, an optical image 1000 of another ballot with audit and adjudication marks is described. In this example, a ballot optical image 1005, audit mark 1010, and adjudication mark 1015 are provided in optical image data. In this example, the optical scan ballot system that generated the audit mark 1010 identified two races as having over-votes. One resulting from mark 1020, and another resulting from a soiled area 1025 on the ballot 1005. Such soiled areas 1025 may be, for example, a coffee stain, food stain, or other type of soil on the ballot. Soiled ballots may be encountered with increased frequency, for example, in mail-in ballots. In this example, an election official readily discerns that mark 1020 is in fact an error on the ballot 1005, and that mark 1025, which resulted in the over-vote indication is a stray mark and not a vote. In this case, the election official adjudicated ballot 1005 to remove the stray mark and record the vote for that particular election area of the ballot 1005 to be for choice 3, corresponding to Jaques Cartier. It will be readily understood that the examples of FIGS. 9 and 10 are but two examples of common situations requiring adjudication. Other examples include votes for write-in candidates, overvotes where the voter also includes a note that a particular vote is not to be counted, marks that are next to a candidates name instead of in the marking area for the votes, etc. Additionally, multiple adjudications may be performed for any particular ballot, with each adjudication appended to the ballot optical image separately from other adjudications. In such a manner, an entire chain of adjudications may be viewed in the single optical image file, allowing a user to view the initial read of the ballot and each adjudication for the ballot.

Figure 11:
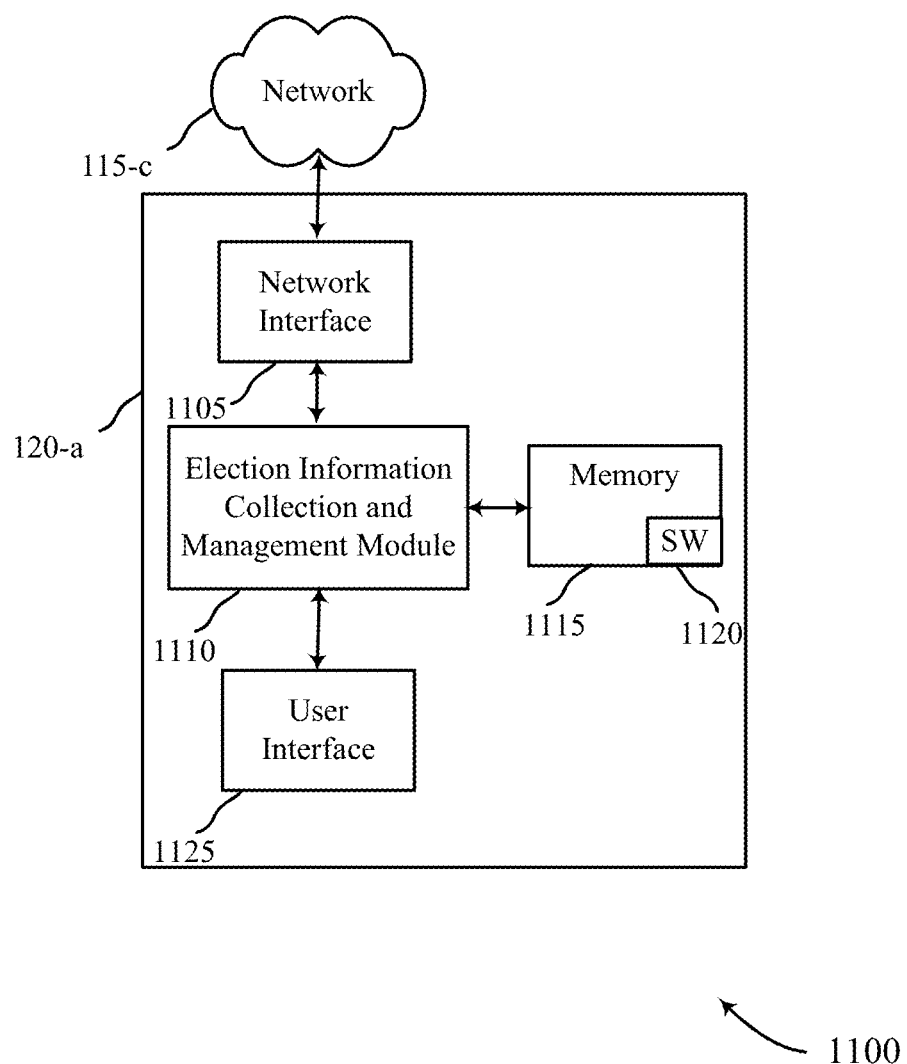
FIG. 11 is a block diagram of a central server computer system according to various embodiments.

With reference now to FIG. 11, a system 1100 is described that includes central server computer system 120-*a* connected with network 115-*c*, according to a set of embodiments. The central server computer system 120-*a* may include a network interface 1105, an election information collection and management module 1110, memory 1115 that includes software 1120 stored therein, and a user interface 1125. The central server computer system 120-*a* may communicate with optical scan ballot system(s) and adjudication system(s), such as systems 105 and 110 of FIGS. 1, 4, and 7-8, through the network 115-*c* in order to receive and send information to such systems. The network interface 1105 may include, for example, commonly used network interface hardware to allow connection with and communication over network 115-*c*. Such network interface hardware may include wired or wireless network interface cards and components, as are well understood in the art.

The election information collection and management module 1110 may receive optical image data from optical scan ballot systems and store the data in memory 1115. Memory 1115 may include a database that is located locally and/or remotely from the central server computer system 120-*a*. Furthermore, central server computer system 120-*a* itself may include a single computer, or may include multiple computers which may be located remotely from one another. In any event, the election information collection and management module 1110 may receive optical image data and use this data to determine cumulative vote counts for one or more elections, and to perform election management tasks such as assigning ballots identified as having errors for adjudication, and assigning ballots to be audited according auditing procedures for the jurisdiction to verify the optical scan ballot systems appear to be properly tabulating votes. In one embodiment, the election information collection and management module 1110 receives optical image data for each scanned ballot, along with audit mark information for each ballot, and maintains appropriate vote counts based on the data. If the audit mark information for a ballot indicates one or more errors for the ballot, the election information collection and management module 1110 may assign the ballot to one or more election officials for adjudication. The election officials may adjudicate the ballots using an adjudication system 110 such as described with respect to FIGS. 1, and 7-8. The election information collection and management module 1110 may receive the adjudicated ballot information back from adjudication systems and update the vote counts for the various elections based on the adjudication information. The election information collection and management module 1110 may then store the optical image data, including the ballot optical image and the adjudication information, in memory 1115 for future retrieval as needed.

The user interface 1125 may include a monitor to display images to the election management officials, as well as a keyboard, mouse, or other data input device as are well known. An election official accessing the user interface 1125 may review optical images including one or more of audit mark information and adjudication information, as necessary. The election official may also use the user interface 1125 to monitor the status of ballots that have been assigned for adjudication and that have been received back at the election information collection and management module 1110 following adjudication. The user interface 1125 may also provide statistical information for use by election officials, as well as a number of other types of information for efficient election management.

Memory 1115 may include random access memory (RAM) and read-only memory (ROM), and store computer-readable, computer-executable software code 1120 containing instructions that are configured to, when executed (or when compiled and executed), cause the election information collection and management module 1110 to perform various functions described herein (e.g., receive ballot optical images, identify images that require adjudication, receive adjudication information, maintain cumulative vote counts, etc.). The components of the central server computer system 120-*a* may, individually or collectively, be implemented with one or more Application Specific Integrated Circuits (ASICs) adapted to perform some or all of the applicable functions in hardware. Each of the noted modules may be a means for performing one or more functions related to operation of the central server computer system 120-*a*.

Figure 12:
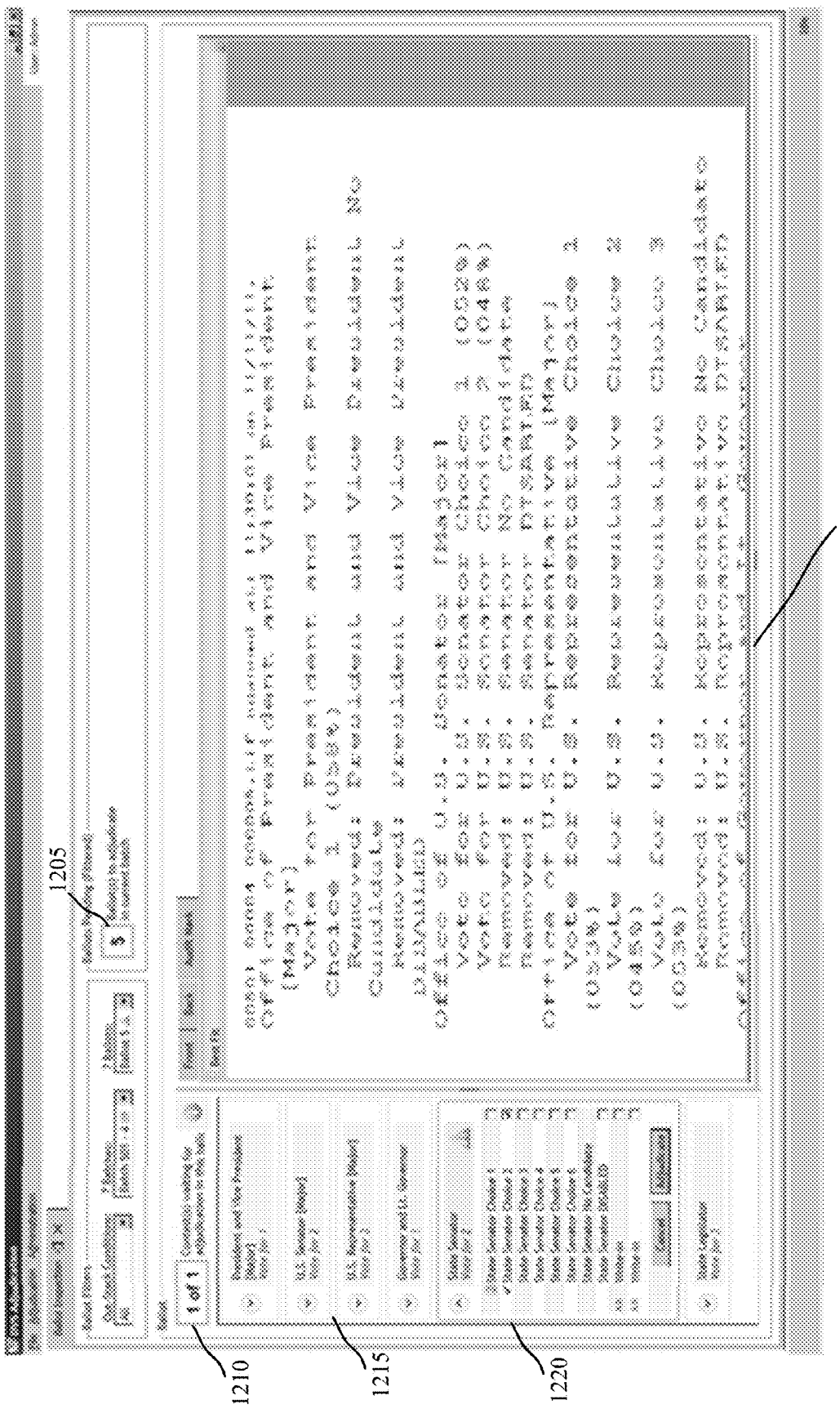
FIG. 12 is a screen shot provided by a central server computer system according to various embodiments.

In one embodiment, the election information collection and management module 1110 executes software that allows for management of the election process, including assigning ballots that require adjudication to one or more election officials. FIG. 12 illustrates a screen shot 1200 that may be provided to an election official operating an adjudication system, such as adjudication system 110 of FIGS. 1, and 7-8. Various areas of the screen provide information to the election official, such as an indication of ballots pending 1205, that indicates how many ballots are pending for adjudication by the election official. The election official may select a ballot to adjudicate, and is provided with an indication 1210 of contents of the ballot that are awaiting adjudication. Different races for the particular election are listed at 1215, with an area 1220 provided to indicate the particular race or question that requires adjudication. The election official may view an image of the ballot, an image of an audit mark for the ballot, and/or an image of a prior adjudication mark in area 1225. The election official may adjudicate the ballot by selecting a candidate that is determined to have been selected by the voter and marking a check box for the candidate, illustrated in this embodiment at 1220.

Figure 13:
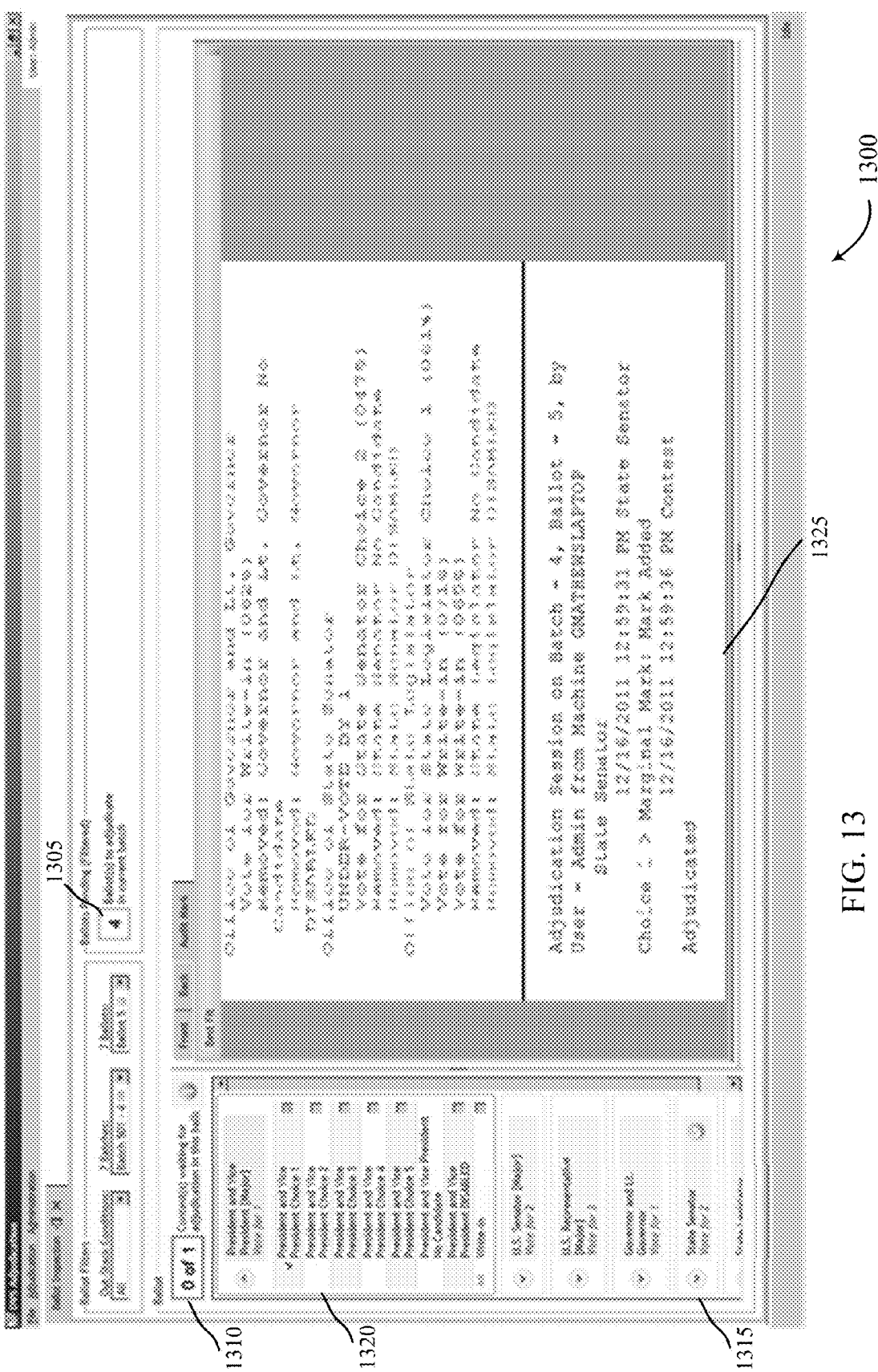
FIG. 13 is another screen shot provided by a central server computer system according to various embodiments.

Following the completion of adjudication the software may update the information provided to the election official, illustrated for one example in the screen shot 1300 of FIG. 13. In this example, following the adjudication of the ballot of the example of FIG. 12, the indication of ballots pending 1305, is updated to indicate how many ballots remain pending for adjudication by the election official. The indication 1310 of contents of the ballot awaiting adjudication is also updated, to indicate, in this example, that no other areas of the ballot require adjudication. Different races for the particular election are listed at 1315, which may be expanded to view the recorded vote on the ballot at area 1320. The election official may view an image of the adjudication mark that they just generated, an image of the ballot, an image of an audit mark for the ballot, and/or an image of a prior adjudication mark in area 1325. In such a manner, ballots may be reviewed and adjudicated in a transparent and efficient manner, and that allows for efficient and effective management through central server computer system 120.

Figure 14:
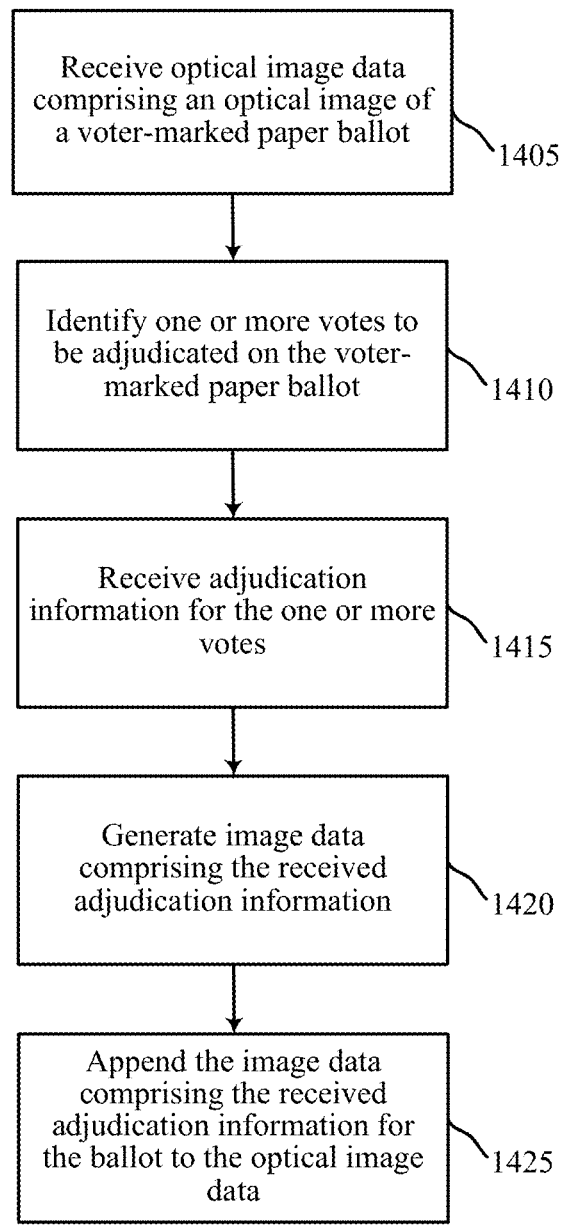
FIG. 14 is a flow chart illustrating operational steps of ballot adjudication according to various embodiments.

With reference now to FIG. 14, a method 1400 for adjudicating ballots is described. The method 1400 may, for example, be performed by an adjudication system, a central server computer system, or optical scan ballot system of FIGS. 1, 4, 7-8, and 11, or using any combination of the devices described for these figures. Initially, at block 1405, optical image data comprising an optical image of a voter-marked paper ballot is received. As discussed above, optical image data may be received from an optical scan ballot system that scans a voter-marked paper ballot, for example. One or more votes to be adjudicated on the voter-marked paper ballot are identified, according to block 1410. Such votes may be identified, for example, as votes that have ambiguous marks on the voter-marked paper ballot, elections or races in which no vote is entered (an 'undervote'), elections or races where too many candidates have been voted for (an 'overvote'), and/or the presence of a write-in candidate. Such votes also may be identified as a result of a damaged or misread ballot where no vote selections can be determined. In some embodiments, votes may be identified as a result of a ballot as a whole that is to be adjudicated. A ballot as a whole may be identified for adjudication in a number of situations, such as misread or damaged ballots as mentioned above, provisional ballots, absentee or mailed-in ballots that may have different formats, etc. Votes requiring adjudication may be identified, in some examples, by a central server computer system, with the optical image data and identified votes for adjudication provided to an adjudication system over a network. In some embodiments, votes requiring adjudication may be identified by an optical scan ballot system, with adjudication of the votes also performed with an adjudication system that is located with or near such an optical scan ballot system. In still other embodiments, areas of multiple ballots may be identified to be adjudicated, such as when a significant number of ballots are identified as not having a vote for a particular race, for example, which may indicate that a system may not be properly reading the ballots.

With continuing reference to FIG. 14, adjudication information for the one or more votes is received, as indicated at block 1415. Such adjudication information may include, for example, an identification of the election official that is adjudicating the ballot, a date and time of adjudication, information on how the one or more votes have been adjudicated, and/or reasons for the adjudication (e.g., ambiguous mark, stray mark, etc.). Adjudication information may also include, in some embodiments, identification of a computer being used for adjudication and a location of the computer. At block 1420, image data is generated that comprises the received adjudication information. Such image data may include all, or a subset of the adjudication information, and in some examples, non-image data may be included with the image data that includes all or a subset of the adjudication information. Finally, at block 1425, the image data comprising the received adjudication information for the ballot is appended to the optical image data. The optical image data then includes data that comprises an optical image of the voter-marked paper ballot and an optical image of the adjudication information that may be displayed together when the optical image data is displayed.

In some embodiments, the optical image data is in a format that is widely known and used, such as, for example, .jpg, .tiff, .bmp, or .pdf format. Having optical image data in such a format allows the ballot optical image and the adjudication information optical image to be viewed on many different platforms and using any of a number of widely available viewers, rather than requiring a proprietary viewer to view both the ballot and adjudication information. Storing the optical image data and adjudication information in the same optical data file also allows viewing of all of the pertinent election information related to the ballot without the need to access a separate database or data store that may have some of the information related to a ballot, such as adjudication information.

Figure 15:
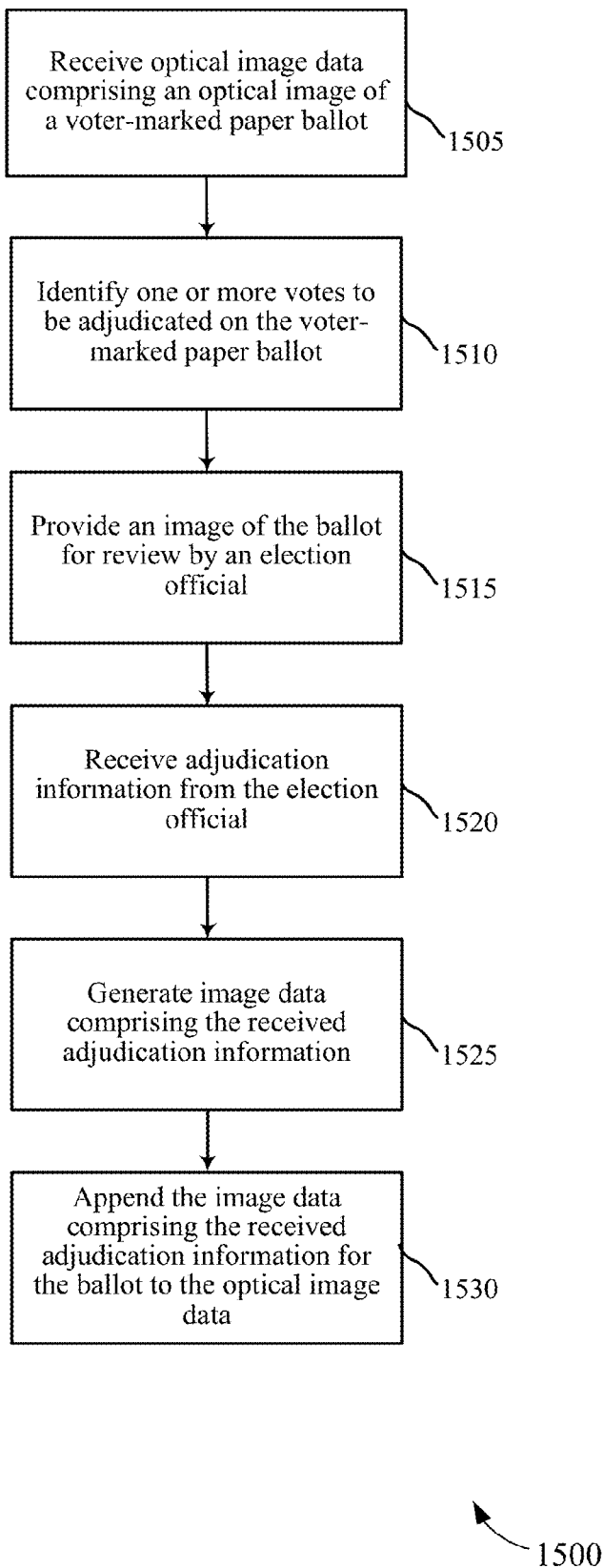
FIG. 15 is another flow chart illustrating operational steps of ballot adjudication according to various embodiments.

With reference now to FIG. 15, another method 1500 for adjudicating ballots is described. The method 1500 may, for example, be performed by an adjudication system, a central server computer system, or optical scan ballot system of FIGS. 1, 4, 7-8, and 11, or using any combination of the devices described for these figures. Initially, at block 1505, optical image data comprising an optical image of a voter-marked paper ballot is received. As discussed above, optical image data may be received from an optical scan ballot system that scans a voter-marked paper ballot, for example. One or more votes to be adjudicated on the voter-marked paper ballot are identified, according to block 1510. Such votes may be identified as described above, for example, as votes that have ambiguous marks, undervote situations, overvote situations, and/or the presence of a write-in candidate. Such votes also may be identified as a result of a damaged or misread ballot where no vote selections can be determined. In some embodiments, votes may be identified as a result of a ballot as a whole that is to be adjudicated, similarly as described above. Votes requiring adjudication may be identified, in some examples, by a central server computer system, or by an optical scan ballot system, with adjudication of the votes performed with an adjudication system that is located either locally or remotely. In other embodiments, areas of multiple ballots may be identified to be adjudicated, similarly as described above.

With continuing reference to FIG. 15, an image of the ballot for review is provided to an election official, as indicated at block 1515. In some embodiments, adjudication is performed on an adjudication system that runs specialized software the communicates with corresponding software on a central server computer system. The software at the central server computer system, in such embodiments, communicates ballots that require adjudication to the adjudication system, along with an identification of the votes on the ballot that require adjudication. At block 1520, adjudication information is received from the election official. The software at the adjudication system, in an example, provides the ballot and information related to votes requiring adjudication an election official who then adjudicates the ballot based on a visual review of the ballot. Adjudication information may include, for example, an identification of the election official that is adjudicating the ballot, a date and time of adjudication, information on how the one or more votes have been adjudicated, and/or reasons for the adjudication (e.g., ambiguous mark, stray mark, etc.). Adjudication information may also include, in some embodiments, identification of a computer being used for adjudication and a location of the computer. At block 1525, image data is generated that comprises the received adjudication information. Such image data may include all, or a subset of the adjudication information, and in some examples, non-image data may be included with the image data that includes all or a subset of the adjudication information. Finally, at block 1530, the image data comprising the received adjudication information for the ballot is appended to the optical image data. The optical image data then includes data that comprises an optical image of the voter-marked paper ballot and an optical image of the adjudication information that may be displayed together when the optical image data is displayed.

In some embodiments, as described above, the optical image data is in a format that is widely known and used, allowing the ballot optical image and the adjudication information optical image to be viewed on many different platforms and using any of a number of widely available viewers. Storing the optical image data and adjudication information in the same optical data file also allows viewing of all of the pertinent election information related to the ballot without the need to access a separate database or data store that may have some of the information related to a ballot, such as adjudication information.

Figure 16:
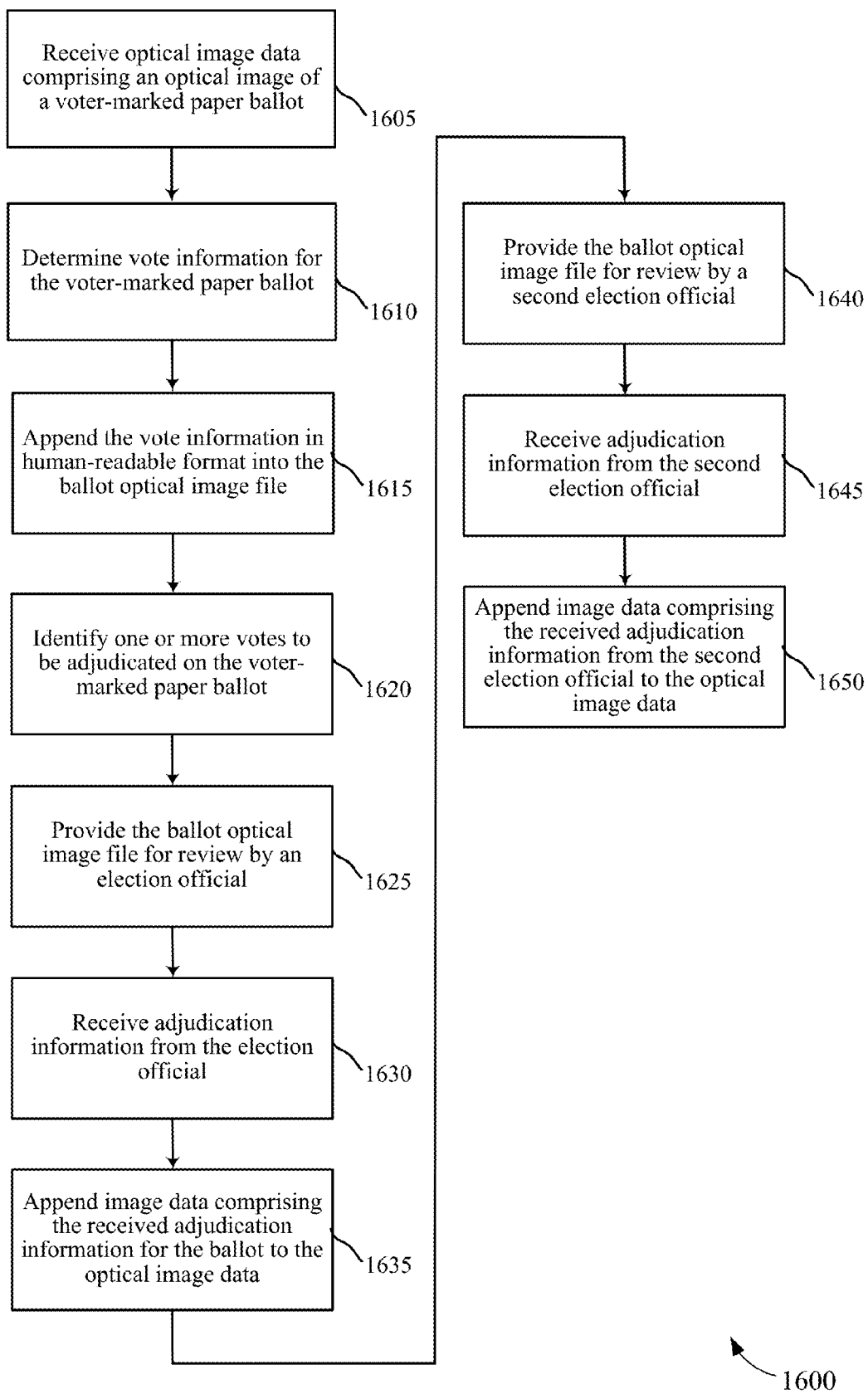
FIG. 16 is another flow chart illustrating operational steps of ballot adjudication according to various embodiments.

In some embodiments, one or more ballots may be adjudicated multiple times. For example, all ballots having write-in candidates may be adjudicated, with ballots having ambiguous marks, overvotes, undervotes, or other errors may be separately adjudicated. Thus, ballots having both a write-in candidate and one or more other errors may be adjudicated multiple times. In other examples, separate officials may adjudicate ballots independently, and in the event that the adjudications do not agree, a judge may make a final ruling on how a vote is to be adjudicated. For example, representatives of each candidate on a ballot may provide separate opinions on how a vote is to be adjudicated, with non-matching opinions ruled on by an elections judge. With reference now to FIG. 16, a method 1600 for adjudicating ballots multiple times is described. The method 1600 may, for example, be performed by an adjudication system, a central server computer system, or optical scan ballot system of FIGS. 1, 4, 7-8, and 11, or using any combination of the devices described for these figures. Initially, at block 1605, optical image data comprising an optical image of a voter-marked paper ballot is received. As discussed above, optical image data may be received from an optical scan ballot system that scans a voter-marked paper ballot, for example. At block 1610, vote information for the ballot is determined Such vote information may be determined as described above, for example, by performing a pixel-based analysis of voting and non-voting areas on the ballot to identify votes cast by the ballot, as well as any errors on the ballot, such as stray marks, overvotes, undervotes, and ambiguous marks. The vote information is appended to the optical image of the ballot in a human-readable format, according to block 1615.

At block 1620, one or more votes to be adjudicated on the voter-marked paper ballot are identified. Such votes may be identified as described above, as one or more votes that have an identified error, for example. An image of the ballot for review is then provided to an election official, as indicated at block 1625. In some embodiments, adjudication is performed on an adjudication system such as described above that runs specialized software as part of an election management software suite that runs across a central server computer system and one or more adjudication systems. At block 1630, adjudication information is received from the election official. Adjudication information may include, for example, an identification of the election official that is adjudicating the ballot, a date and time of adjudication, information on how the one or more votes have been adjudicated, and/or reasons for the adjudication (e.g., ambiguous mark, stray mark, etc.). Adjudication information may also include, in some embodiments, identification of a computer being used for adjudication and a location of the computer. At block 1635, image data is appended to the optical image data that comprises the received adjudication information. Such image data may include all, or a subset of the adjudication information.

Next, at block 1640, an image of the ballot for review is provided to a second election official. As mentioned above, the second election official may be a representative of a candidate, a representative of a political party, or a second election official focused on a particular type of adjudication such as adjudication of write-in votes. Adjudication may be performed on an adjudication system such as described above. At block 1645, adjudication information is received from the second election official. Adjudication information may include, for example, an identification of the second election official, along with one or more other items of adjudication information such as described above. At block 1650, image data is appended to the optical image data that comprises the received adjudication information from the second election official. Such image data may include all, or a subset of the adjudication information. In some embodiments more that two election officials may adjudicate a ballot, in which case the operations of blocks 1640 through 1650 are repeated for each additional election official. Thus, the optical image data includes an optical image of the ballot, and adjudication information from each election official that adjudicated the ballot.

In some embodiments, as described above, the optical image data is in a format that is widely known and used, allowing the ballot optical image and the adjudication information from each election official to adjudicate the ballot to be viewed on many different platforms and using any of a number of widely available viewers. Storing the optical image data and adjudication information in the same optical data file also allows viewing of all of the pertinent election information related to the ballot without the need to access a separate database or data store that may have some of the information related to a ballot, such as adjudication information.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A method comprising:
    identifying one or more votes to be adjudicated on a voter-marked ballot;
    providing an image of the voter-marked ballot for review by one or more election officials;
    receiving adjudication information from the one or more election officials, wherein the adjudication information includes a determination whether a particular mark on the ballot should be recorded as a vote;
        generating image data comprising the received adjudication information; and
    appending the image data comprising the received adjudication information for the ballot to the optical image data.

2. The method of claim 1, wherein the adjudication information comprises:
    an identification of an election official performing the adjudication; and
    a record that one or more votes on the ballot have been adjudicated.

3. The method of claim 1, wherein the adjudication information further comprises a date and time of adjudication.

4. The method of claim 1, wherein appending the image data comprising the received adjudication information for the ballot to the optical image data comprises:
    inserting text in a margin of the optical image of the ballot, the text including the adjudication information.

5. The method of claim 1, further comprising:
    displaying the optical image data including an image of the ballot and adjudication information appended to the image of the ballot.

6. The method of claim 1, wherein identifying one or more votes recorded on the voter-marked paper ballot to be adjudicated comprises:
    evaluating a target area on the ballot; and
    determining that a mark within the target area is ambiguous.

7. The method of claim 1, wherein identifying one or more votes recorded on the voter-marked paper ballot to be adjudicated comprises:
    determining that the ballot as a whole is to be adjudicated.

8. The method of claim 1, wherein identifying one or more votes recorded on the voter-marked paper ballot to be adjudicated comprises:
    determining that one or more portions of the ballot include a different number of votes than expected.

9. The method of claim 1, wherein identifying one or more votes recorded on the voter-marked paper ballot to be adjudicated comprises:
    determining that one or more portions of multiple ballots include one or more votes to be adjudicated.

10. The method of claim 1, wherein identifying one or more votes recorded on the voter-marked paper ballot to be adjudicated comprises:
    inspecting the ballot image to determine if a write-in vote has been selected; and
    assigning the write-in selection to a candidate.

11. The method of claim 1, wherein identifying one or more votes recorded on the voter-marked paper ballot to be adjudicated comprises:
    receiving an indication that one or more votes recorded on the voter-marked paper ballot require adjudication.

12. A system for adjudication of voter-marked paper ballots, comprising:
    a receiver module configured to receive ballot optical image data comprising an optical image of a voter-marked paper ballot; and
    an adjudication module configured to receive adjudication information from one or more election officials, wherein the adjudication information includes a determination whether a particular mark on the ballot should be recorded as a vote, generate image data comprising the received adjudication information for the ballot and append the image data for the ballot to the optical image data.

13. The system of claim 12, wherein the adjudication module is configured to receive an indication that the ballot requires adjudication when a mark within a target area of the ballot is determined to be ambiguous.

14. The system of claim 12, wherein the adjudication module is configured to receive an indication that the ballot as a whole requires adjudication.

15. The system of claim 12, wherein the adjudication information comprises one or more of:
    an identification of an election official performing the adjudication;
    a record that one or more votes on the ballot have been adjudicated; or
    a date and time of adjudication.

16. The system of claim 12, wherein the image data comprising the received adjudication information for the ballot is inserted as text in a margin of the optical image of the ballot.

17. A system for adjudication of voter-marked paper ballots, comprising:
    means for identifying one or more votes recorded on a voter-marked paper ballot to be adjudicated;
        means for receiving adjudication information from the one or more election officials, wherein the adjudication information includes a determination whether a particular mark on the ballot should be recorded as a vote;
        means for generating image data comprising the received adjudication information; and
        means for appending the image data comprising the received adjudication information for the ballot to the optical image data.

18. The system of claim 17, further comprising:
  means for providing an image of the ballot for review by an election official; and
  means for receiving adjudication information from the election official.

19. The system of claim 17, wherein the means for incorporating the adjudication information into the ballot optical image file comprises:
  means for inserting text in a margin of the optical image of the ballot, the text including the adjudication information.

\* \* \* \* \*